June 23, 1964 E. L. LOVE ETAL 3,138,020
SPRING TESTING APPARATUS
Filed Jan. 15, 1960 3 Sheets-Sheet 1

INVENTORS:
EVERT L. LOVE
HOWARD E. EMGE
BY Gravely, Lieder & Woodruff
ATTORNEYS.

June 23, 1964 E. L. LOVE ETAL 3,138,020
SPRING TESTING APPARATUS
Filed Jan. 15, 1960 3 Sheets-Sheet 2

INVENTORS:
EVERT L. LOVE
HOWARD E. EMGE
BY Gravely, Lieder & Woodruff
ATTORNEYS.

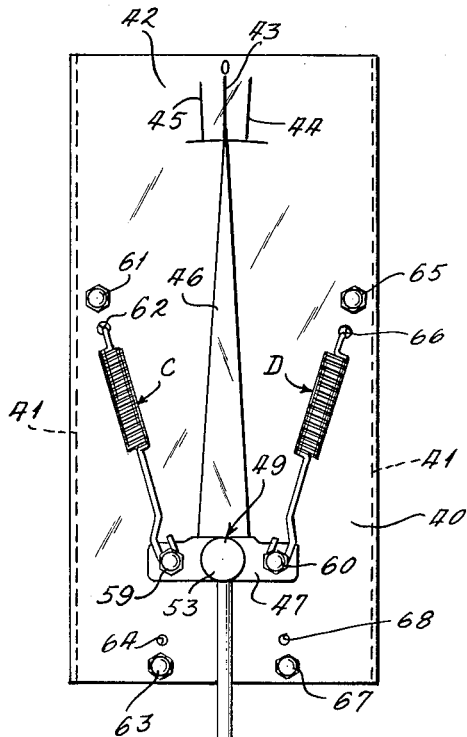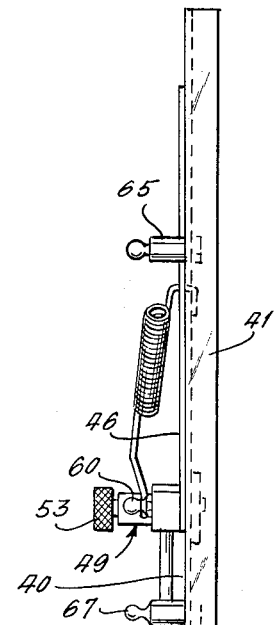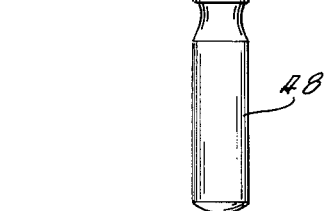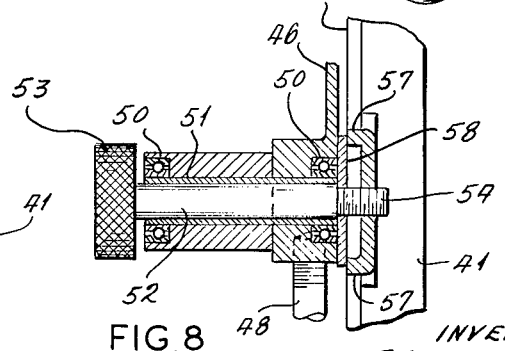

United States Patent Office 3,138,020
Patented June 23, 1964

3,138,020
SPRING TESTING APPARATUS
Evert L. Love, 628 Landor Court, Lemay, Mo., and Howard E. Emge, 1723 N. Ballas Road, Kirkwood, Mo.
Filed Jan. 15, 1960, Ser. No. 2,719
4 Claims. (Cl. 73—161)

This invention relates to apparatus for testing springs and is particularly concerned with apparatus for testing the springs employed in automotive wheel brake systems.

The inventive improvement hereof is more particularly concerned with the problem of maintaining wheel brake systems in the best possible operating condition. The present automobiles and like vehicles are provided with powerful engines having an abundance of reserve power, and in most instances a rather low power to weight ratio which favors higher operating speeds. As one consequence, the brake systems are subjected to enormous stress in service but must be quite reliable and have the required stopping power. In other words, modern brake systems must be able to deliver the power to stop the vehicles and to dissipate the heat created by the brake shoes on the brake drums in a rapid manner. The heat generated in brake systems has a destructive effect on the parts thereof, and the brake shoe retraction springs are parts which become heated in each braking operation and show a rapid loss of strength and deterioration. The effect of this heat on the springs is to reduce their effectiveness to fully withdraw the brake shoes so that the shoes drag and continue to heat up which further adversely affect the springs. The problem has not been fully appreciated with the result that many brakes quickly fail again because mechanics fail to completely test the spring action of the brake system when replacing brake linings or when adjusting the shoe clearance.

It has been found that the heat generated in brake systems does not follow any definite pattern as between wheel assemblies so that unequal deterioration of parts results, and this is especially true of the retraction springs. The result is unequal brake shoe wear since the shoes may not be equally and fully withdrawn after a period of service. It is therefore an object of this invention to provide a simple and easy means for testing the springs to determine the extent of loss of power and to provide the mechanic with a reliable and fast operating apparatus to find springs which need to be replaced whereby brake systems may be restored to a high level of operating reliability and long service.

It is an object of this invention to provide apparatus which can easily test used springs against a standard or new spring and reveal when a used spring has fallen below a certain degree of strength relative to the standard or new spring.

It is an object of this invention to provide apparatus of the type indicated which does not embody delicate parts, scale mechanisms and the like, or any balancing operation other than the simple and direct method of determining the equality of brake springs as between a pair thereof. Since most brake systems have pairs of brake shoes in each wheel, it is important to install springs which are matched or have as nearly equal characteristics as possible so that the brake shoes retract to the same extent, thereby avoiding brake shoe drag.

Another object of this invention is to provide an inexpensive apparatus which will handle a variety of brake springs and may be easily arranged to take different springs.

A further object of this invention is to provide apparatus which will quickly determine which of two springs should be discarded and when two springs have the same or nearly the same characteristics.

These and other objects will be more particularly pointed out in the following description of certain preferred embodiments of apparatus which perform in the desired manner. Briefly, the apparatus consists in a base having a rotating head which provides an anchorage for one end of each of a pair of springs, and spaced and selectivley usable means for retaining the opposite ends of the spring pair. The rotating head is free to rotate to a position determined by the springs and a pointer sweeps a scale to show the extent of loss, if any, of spring strength. Means on the rotating head is provided for rapidly inserting and removing the springs, and provision is made to accommodate a torque wrench or similar tool whereby a direct force reading may be obtained, but in general the apparatus is operated by comparing a pair of springs one against the other to determine the equality or inequality thereof, and this for tension or compression springs.

The apparatus also consists in those parts and components which will hereinafter be described and claimed, reference being directed to the accompanying drawings, wherein:

FIG. 5 is a top plan view of a modified apparatus embodying the principles of this invention;

FIG. 6 is a side elevational view of the apparatus of FIG. 5;

FIG. 7 is a fragmentary view of the apparatus of FIG. 5 as seen from the under side;

FIG. 8 is a greatly enlarged and fragmentary sectional view seen at line 8—8 in FIG. 7.

Figure 1:
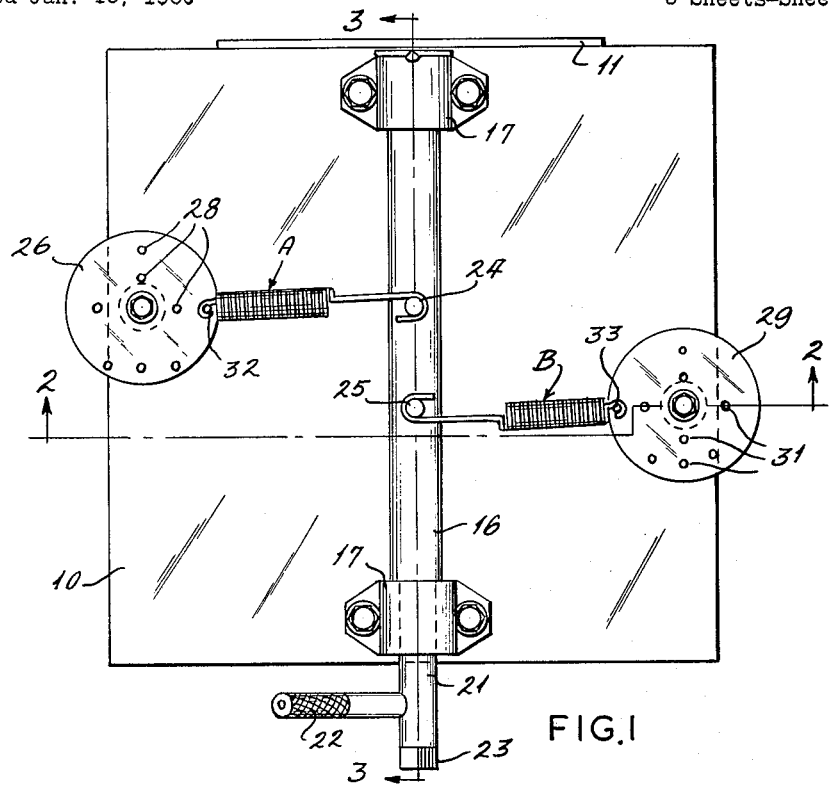
FIG. 1 is a top plan view of the apparatus for testing brake springs.
Figure 2:
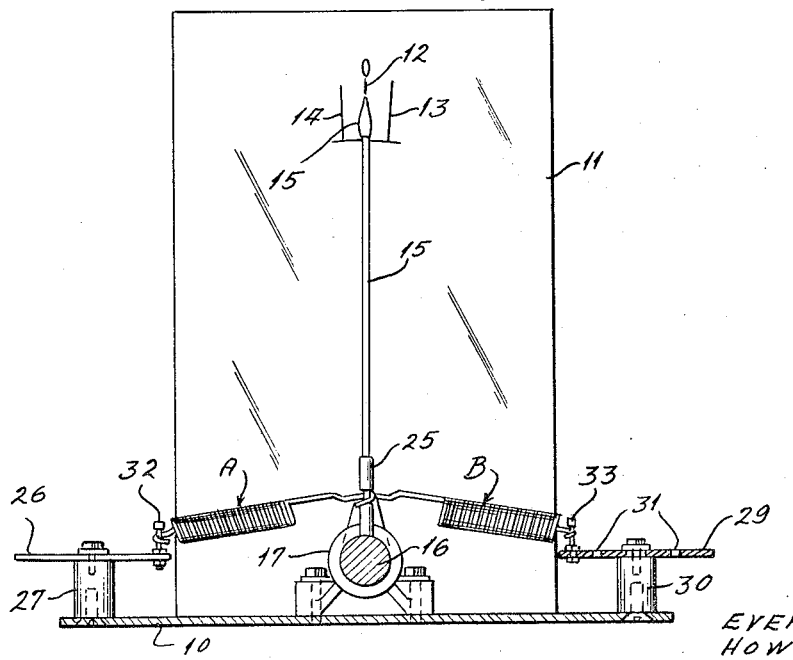
FIG. 2 is a transverse sectional elevational view seen at line 2—2 in FIG. 1.
Figure 3:
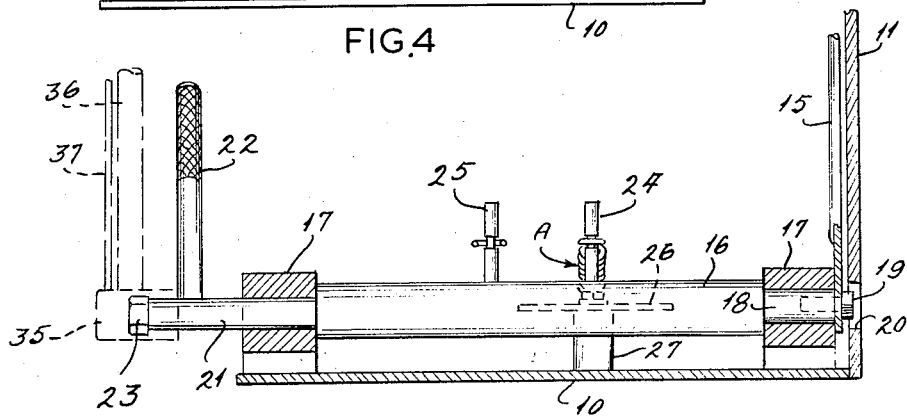
FIG. 3 is a longitudinal sectional elevational view seen at line 3—3 in FIG. 1.

In FIGS. 1 to 3, the apparatus is seen to include a base 10 having an upstanding plate 11 secured at one edge as a part thereof to form a scale area upon which may be inscribed a scale having a zero index 12 and other indicia 13 and 14 denoting a range of deflection of a pointer 15 away from the zero index 12. The pointer is mounted on rotatable head 16 which may comprise an elongated rod mounted on base 10 in suitable bearings 17. One end 18 of the head 16 is reduced and extends through the adjacent bearing 17 to provide an exposed end for a threaded element 19 which attaches the pointer 15 to move with the head. An aperture 20 in the plate 11 is aligned for access to the element 19. The other reduced end 21 of the head 16 extends through the adjacent bearing 17, and an operating handle 22 is mounted in the end 21. The outer end 23 of the reduced end 21 is suitably formed for a purpose to appear.

The rotatable head 16 is provided with upstanding anchor pins 24 and 25 which are aligned in the longitudinal axis of the head 16. Pin 24 is arranged opposite to selectively usable spring retaining means which is in the form of a disk 26 mounted on a stand 27 fixed to the base 10. The disk 26 is rotatable and is provided with a plurality of apertures 28, any of which may be moved to a position on a line extending from the stand 27 through the pin 24 so that the longitudinal axis of a spring part A to be tested is substantially perpendicular to the axis of the head 16. The remaining pin 25 is similarly associated with another selectively usable spring retaining means for another spring part B. This second means includes a disk 29 rotatably mounted on a stand 30 fixed to base 10.

The disk is formed with a plurality of apertures 31, any one of which may be used to dispose spring B in its test position, as shown. When the ends of the springs are hook-formed, pins 32 and 33 may be disposed in a selected aperture in each disk 26 and 29, as in the view of FIG. 2, and the other ends are then engaged on the pins 24 and 25.

In operating the apparatus of FIGS. 1 to 3, the mechanic mounts spring A between pins 24 and 32 by rotating the head 16 through handle 22 until the spring ends are engaged. The handle 22 is then rotated clockwise to allow spring B to be engaged upon pins 25 and 33. This may require some force to overcome spring A temporarily. When the handle 22 is released the springs A and B are freed but under tension so as to oppose each other, and the disks 26 and 29 rotate to neutral positions. If the springs A and B are equal in tension characteristics the pointer 15 will move to the zero index 12, as shown in FIG. 2. However, if one spring (say spring A) is stronger than the other (spring B) its initial tension will pull pointer 15 to its side of the index 12 and should the opposite spring (spring B) be very weak the pointer 15 will move outside the indicia 14 indicating such condition. The opposite condition should find pointer 15 near indicia 13 to indicate that spring B is stronger than spring A. The weakened spring is discarded and another spring is inserted until the two springs are indicated to be equal or within the range of pointer motion between indicia 13 and 14.

When the end formation of the springs is other than that shown in FIG. 2, the pins 32 and 33 are removed and the ends directly inserted in the desired apertures 28 and 31. The disks 26 and 29 are, of course, rotated to suit the length of the springs being tested. The apparatus is intended to show when a pair of springs is matched as to tension so that the operation in a brake system will be desirably alike.

Figure 4:
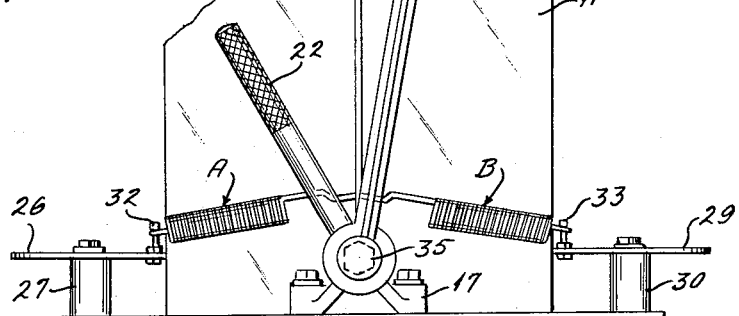
FIG. 4 is a front elevational view of the apparatus seen in FIG. 1, but illustrating the same when used with a torque wrench or similar tool.

As shown in FIG. 4, the apparatus of FIG. 1 may be used in conjunction with a torque wrench or tool 34 of known type, and when so used one spring at a time may be mounted therein. The tool 34 has a socket 35 which fits snugly on the end 23 of the head 16. A deflection member 36 and a pointer 37 are attached to the socket 35, and a scale 38 is carried at the outer end of the deflection member 36 adjacent handle 39. When force is applied at handle 39 rightwardly, as in FIG. 4, to move the pointer 15 to the zero index 12, the member 36 will deflect and pointer 37 will move relatively leftwardly (dotted outline) along scale 38 to give a torque reading (inch pounds for example).

Turning now to FIGS. 5 to 8, the modified apparatus shown consists in a base 40 having side flanges 41 for feet. A portion of the base surface forms a scale area 42 on which is inscribed a zero index 43 and side indicia 44 and 45. A pointer 46 cooperates with the inscription and is mounted on a movable head 47 to which is attached an operating handle 48. As seen in FIGS. 7 and 8, the head 47 includes a bearing post 49, and the post and head each carry an anti-friction bearing 50 of suitable construction and a spacer sleeve 51 for a mounting shaft 52 having a knurled knob 53 at the outer end and a reduced diameter threaded end 54. The base 40 is formed with an elongated slot 55 in alignment with the zero index 43, and a lock slide 56 is mounted over the slot 55 from the under side of the base (FIGS. 7 and 8) so that anti-rotation tabs 57 fit into the slot. The parts of the head 47 are assembled as in FIG. 8 and the shaft 52 is threaded into the lock slide 57 until the shoulder at the threaded end 54 engages on a washer 58 and draws the tabs 57 into the slot 55. The head 47 may be selectively positioned along the slot 55 and tightened by turning the knob 53, as is understood.

This form of the apparatus is provided with spring anchor pins 59 and 60 fixed on the head 47 at each side of post 49, and these pins cooperate selectively with other spring anchor means. For example for long springs, the pin 59 is associated with a fixed anchor pin 61 and an aperture 62, and for shorter springs with a fixed anchor pin 63 and an aperture 64. Similarly, the pin 60 is associated with a pin 65 and an aperture 66 for long springs, and with a pin 67 and an aperture 68. In this form of the apparatus the head 47 is selectively movable, while in the form shown in FIG. 1, the disks 26 and 29 are selectively movable. The effect is the same in either case.

In operation, a test spring C has one end hooked into the base aperture 62 and the other end engaged on the pin 59. This is made easy by swinging handle 48 clockwise to bring pin 59 closer to the aperture. The handle 48 is moved counterclockwise loading spring C until spring D has been properly positioned. When the handle is released the springs, if equal, should adjust the pointer to the zero index 43. If spring C is stronger it will swing the pointer to the right or toward indicia 44, and if spring D is the stronger it will swing the pointer leftwardly toward indicia 45. In either event, the position of the pointer 46 will indicate which of two springs ought to be discarded, and will also indicate when a pair of springs is desirably matched.

Figure 9:
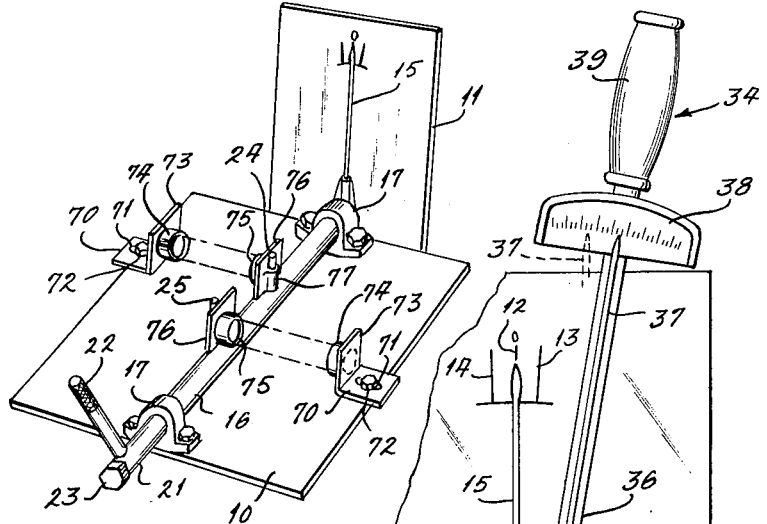
FIG. 9 is a perspective view on a reduced scale of apparatus similar to that shown in FIG. 1 but adapted to handle compression springs.

In FIG. 9 the apparatus is similar to that shown in FIG. 1 and similar numerals of reference will be applied for similar parts therein. The apparatus is intended to handle compression type springs and adapters are used to convert the apparatus of FIG. 1 to the use intended in this modification. For example, the disks 26 and 29, together with the stands 27 and 30, are removed and replaced with an adjustable spring receiver. Each receiver comprises an angular body 70 having a slot 71 in the foot portion to receive a holding element 72. The element 72 uses the aperture in base 10 for the attachment of stand 30, and the same applies for the opposite receiver. The body 70 also has an upstanding plate 73 which supports a tubular socket 74 for one end of a compression spring (not shown). The other end of such a spring is retained in a spaced socket 75 which is supported on a backing plate 76, in turn, removably mounted on a pin 24 or 25 by means of a sleeve 77 secured to the back of the plate 76 in position to slide over the pin and turn to align the socket 75 as required by the angular position of the spring. Thus the adapter devices shown at 70 and 76 suffice to convert the apparatus of FIG. 1 to that in FIG. 9. Similar adapter devices may be provided for the modified apparatus in FIG. 5 so that the same may be converted to accommodate compression springs.

Certain preferred forms of the invention have been illustrated and described, but other equivalent apparatus may be suggested from the foregoing such as the apparatus for use in testing large size springs for trucks, trailers and heavy vehicle equipment, as well as in other uses. It is, therefore, to be understood that all such apparatus for testing springs for use in brake systems, or for other purposes, is intended to be included within the spirit and scope of the invention and the appended claims.

What is claimed is:

1. Spring testing apparatus comprising a base, a head rotatably mounted on said base to move about a fixed axis, indicia on said base spaced from said head, a pointer carried by said head and extending into cooperating relation with said indicia, said indicia havng a matched spring index and another index adjacent thereto indicative of a range of spring inequality, a first pair of spaced anchor elements carried by said head to move therewith about its fixed axis, and at least one pair of anchor elements carried by said base in position such that said base mounted anchor elements are spaced from said first pair of anchor elements and are on opposite sides of a line drawn between said fixed axis for said rotatable head and said matched spring index, one of said first pair of anchor elements and one of said base mounted anchor elements serving to retain a first spring by its ends for comparison testing with a second spring retained by its ends between the other of said first pair of anchor elements and another one of said base mounted anchor elements, whereby said pointer is moved by said head to visually indicate spring equality by registering with said matched spring index or a range of inequality between springs by registering in said inequality range of said indicia.

2. Apparatus for testing for matched strength characteristics of springs comprising a base, a head member, pivot forming means attaching said head member to said base for rotation about a pivot axis, said pivot means being adjustably connected to said base for varying the position of attachment of said head to said base, a scale on said base spaced from said pivot axis and including a first index indicative of matched springs and another index indicative of spring inequality, first spring anchor means carried by said head member in spaced relation so as to move in paths on opposite sides of a line drawn between said pivot axis and said first index, second spring anchor means carried by said base and being spaced from said first anchor means and also being spaced apart on opposite sides of said line drawn between said pivot axis and said first index, and pointer means carried by said head member in position to extend toward said scale and move relative thereto to indicate the relative strength characteristics of springs held between said first and second anchor means and disposed at each side of said line drawn between said pivot axis and said first index, said pivot means for said head member being adjustably movable selectively toward and away from said scale on said base whereby said first anchor means carried by said head are moved relative to said second anchor means to accommodate different length springs for testing.

3. Apparatus for testing for matched strength characteristics of springs comprising a base, a head member pivotally mounted on said base for movement about a pivot axis, a scale on said base spaced from said pivot axis and including a first index indicative of matched springs and another index indicative of spring inequality, first spring anchor means carried by said head member in spaced relation, second spring anchor means, means adjustably connecting said second spring anchor means to said base, said second anchor means being spaced from said first anchor means and also being spaced apart on opposite sides of a line drawn between said pivot axis and said first index, and pointer means carried by said head member in position to extend toward said scale and move relative thereto to indicate the relative strength characteristics of springs held between said first and second anchor means and disposed at each side of said line drawn between said pivot axis and said first index, and said second spring anchor means through said adjustable connecting means being movable relative to said head member to accommodate different length springs for testing.

4. The apparatus set forth in claim 2 wherein a lever is connected to said head member to swing said head member about its pivot axis whereby said first spring anchor means are manually moved initially to decrease the spacing with said second spring anchor means for positioning springs to be tested on said first and second anchor means, release of said lever permitting said head member to pivot to a position of equilibrium between the springs to be tested.

References Cited in the file of this patent
UNITED STATES PATENTS

| | | |
|---|---|---|
| 62,775 | Plympton | Mar. 12, 1867 |
| 2,005,773 | De Florez | June 25, 1935 |
| 2,007,880 | Sharp | July 9, 1935 |
| 2,113,550 | Nieman | Apr. 5, 1938 |
| 2,171,872 | Zimmerman | Sept. 5, 1939 |
| 2,972,248 | Gerhardt | Feb. 21, 1961 |